(12) United States Patent
Boutoussov et al.

(10) Patent No.: US 11,844,658 B2
(45) Date of Patent: Dec. 19, 2023

(54) DENTAL SYSTEM AND METHOD

(71) Applicant: Biolase, Inc., Irvine, CA (US)

(72) Inventors: Dmitri Boutoussov, Dana Point, CA (US); Manvel Andriasyan, San Diego, CA (US)

(73) Assignee: BIOLASE, INC., Foothill Ranch, CA (US)

( * ) Notice: Subject to any disclaimer, the term of this patent is extended or adjusted under 35 U.S.C. 154(b) by 175 days.

(21) Appl. No.: 17/107,606

(22) Filed: Nov. 30, 2020

(65) Prior Publication Data

US 2021/0145538 A1    May 20, 2021

Related U.S. Application Data

(63) Continuation of application No. 15/726,221, filed on Oct. 5, 2017, now abandoned.

(60) Provisional application No. 62/404,698, filed on Oct. 5, 2016.

(51) Int. Cl.
*A61C 1/00* (2006.01)
*G06Q 30/016* (2023.01)

(52) U.S. Cl.
CPC .......... *A61C 1/0015* (2013.01); *A61C 1/0046* (2013.01); *G06Q 30/016* (2013.01)

(58) Field of Classification Search
CPC ... A61C 1/0015; A61C 1/0046; G06Q 30/016
USPC ........................................................ 606/11
See application file for complete search history.

(56) References Cited

U.S. PATENT DOCUMENTS

| | | |
|---|---|---|
| 6,135,774 A | 10/2000 | Hack et al. |
| 6,270,342 B1 | 8/2001 | Neuberger et al. |
| 6,663,386 B1 | 12/2003 | Moelsgaard |
| 6,744,790 B1 | 6/2004 | Tilleman et al. |
| 8,311,791 B1 | 11/2012 | Avisar |
| 8,848,282 B2 | 9/2014 | Islam |
| 8,936,465 B2 | 1/2015 | Helfenbein |
| 9,220,563 B1 | 12/2015 | Griffin |
| 2004/0012713 A1 | 1/2004 | Dittmer |
| 2007/0128576 A1 | 6/2007 | Boutoussov |
| 2007/0243934 A1 | 10/2007 | Little et al. |
| 2008/0276192 A1 | 11/2008 | Jones et al. |
| 2009/0225060 A1 | 9/2009 | Rizoiu et al. |
| 2010/0036535 A1 | 2/2010 | Feine et al. |

(Continued)

*Primary Examiner* — Carl H Layno
*Assistant Examiner* — Michael J Lau
(74) *Attorney, Agent, or Firm* — Greenberg Traurig, LLP

(57) ABSTRACT

Embodiments of the invention provide a dental network including a portable dental laser station controllable within a remote access system. The dental laser station can include a dental laser, and a dental handpiece assembly coupled to or including the at least one dental laser. Some embodiments include a processor and a non-transitory computer-readable storage medium including a dental laser management process to exchange dentistry-related parameters between the dental laser station or components and a remote network. Some embodiments include a handpiece assembly structured so that any beam size on the output window or surface is greater than any beam size exiting at the input window or surface. Some embodiments include a laser power supply combination with at least one high voltage (HV) power supply, a coupled or integrated simmer supply, a direct current (DC) supply, and at least one laser configured with a power supply.

20 Claims, 13 Drawing Sheets

(56) References Cited

U.S. PATENT DOCUMENTS

| | | |
|---|---|---|
| 2010/0216088 A1 | 8/2010 | Bierbaum et al. |
| 2011/0039229 A1 | 2/2011 | Senia |
| 2011/0306986 A1* | 12/2011 | Lee .................. A61B 34/37 |
| | | 606/130 |
| 2012/0136383 A1 | 5/2012 | Boutoussov et al. |
| 2013/0059264 A1* | 3/2013 | Monty ................ A61C 1/0015 |
| | | 433/29 |
| 2014/0088577 A1 | 3/2014 | Anastassiou et al. |
| 2014/0160085 A1 | 6/2014 | Rabii et al. |
| 2014/0170588 A1 | 6/2014 | Miller et al. |
| 2014/0272771 A1* | 9/2014 | Boutoussov ........... A61G 15/14 |
| | | 433/29 |
| 2015/0265259 A1 | 9/2015 | Regere et al. |
| 2015/0268803 A1* | 9/2015 | Patton .................. A61C 1/0007 |
| | | 715/771 |
| 2015/0305811 A1* | 10/2015 | Neuberger ............. A61B 18/22 |
| | | 606/7 |
| 2016/0179352 A1 | 2/2016 | Shiraishi |
| 2016/0104194 A1 | 4/2016 | Jang et al. |
| 2016/0171059 A1 | 6/2016 | Diamond et al. |
| 2016/0220391 A1 | 8/2016 | Duval et al. |
| 2018/0021104 A1* | 1/2018 | Duncan ................ A61C 1/0046 |
| | | 433/29 |

\* cited by examiner

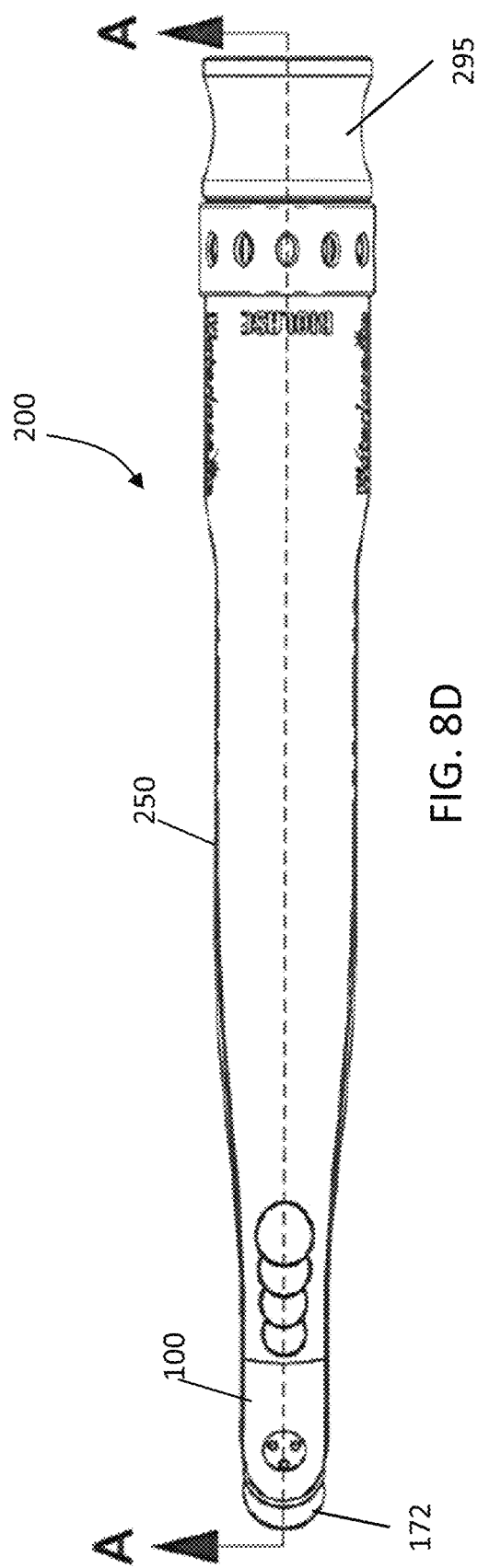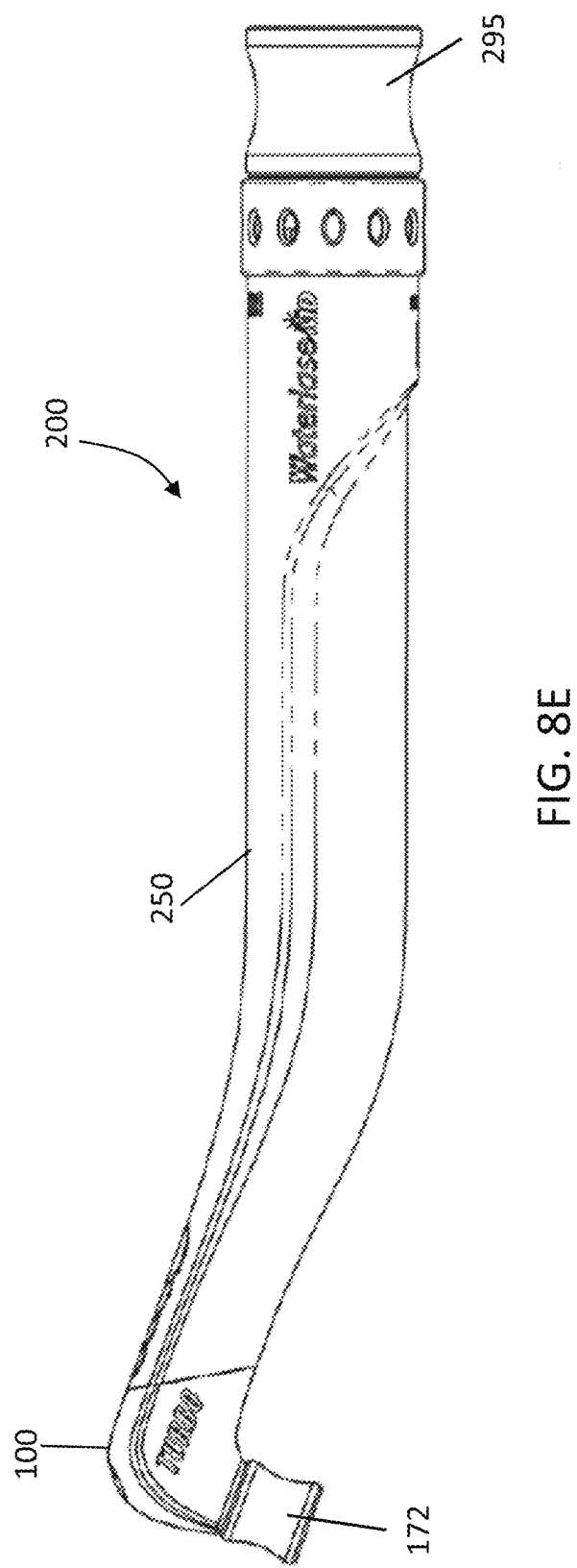
FIG. 8D
FIG. 8E

DENTAL SYSTEM AND METHOD

RELATED APPLICATIONS

This application is a Continuation Application of U.S. patent application Ser. No. 15/726,221, filed Oct. 5, 2017, which claims the benefit of U.S. Provisional Patent Application Ser. No. 62/404,698, filed Oct. 5, 2016, the disclosure and content of which is incorporated by reference herein in its entirety.

BACKGROUND

The increasing range and sophistication of dental laser tools has broadened their appeal within the dental community. Many dental practices will currently have at least one complex dental laser station that can include various control systems, displays, and one or more user interfaces of various forms that are used to control the tool, and/or monitor and communicate some function or operational characteristic of the tool. The laser station may include different electromagnetic energy sources that output different wavelengths of light that can be used together in performing various procedures. The dentist may be presented with options for adjusting one or more operating parameters of one or more of the electromagnetic energy sources depending on the procedure. The ability to update any of the system parameters automatically, produce online reports, and connect remotely for reporting and metrics is limited in most current standalone systems that do not integrate a remote access capability. Furthermore, sub-optimal handpiece design can limit the functionality of the dental laser station. Additionally, the power supply of the dental laser station is often not compact or efficient enough to meet portability requirements.

SUMMARY

Some embodiments include a dental network comprising at least one portable dental laser station configurable and controllable within a remote access system. In some embodiments, the dental laser station includes at least one dental laser, and a dental handpiece assembly coupled to or including the at least one dental laser. Some embodiments include a processor and a non-transitory computer-readable storage medium in data communication with the processor. In some embodiments, the non-transitory computer-readable storage medium includes a dental laser management process executable by the processor, and configured to manage exchange of at least one dentistry-related parameter between the at least one removable or portable dental laser station or one or more components coupled to the dental laser station and a remote network. Some embodiments include a GUI display linked to or included in the dental laser station. In some embodiments, the GUI display can be configured to display at least one operating parameter of the at least one dental laser, and any information received from or exchanged between the remote network of the remote access system and the at least one dental laser station.

Some embodiments include a handpiece assembly comprising an optical fiber distal end extending to an input window or surface of a fiber lens. In some embodiments, the optical fiber distal end is configured to direct a laser beam through a tip. Some embodiments include an output window or surface of the fiber lens. In some embodiments, the fiber lens is structured so that any beam size on the output window or surface is greater than any beam size exiting at the input window or surface. Further, some embodiments include a mirror positioned to direct a laser beam exiting the output window or surface to a replaceable micro-lens of the tip that is configured to be place near or on a target surface.

Some embodiments include a laser power supply combination comprising at least one high voltage (HV) power supply, a coupled or integrated simmer supply, a direct current (DC) supply, and at least one laser configured with a power supply.

DESCRIPTION OF THE DRAWINGS

FIG. 8D illustrates a top view of the handpiece assembly in accordance with some embodiments of the invention.

FIG. 8E illustrates a side view of the handpiece assembly in accordance with some embodiments of the invention.

DETAILED DESCRIPTION

Figure 1:
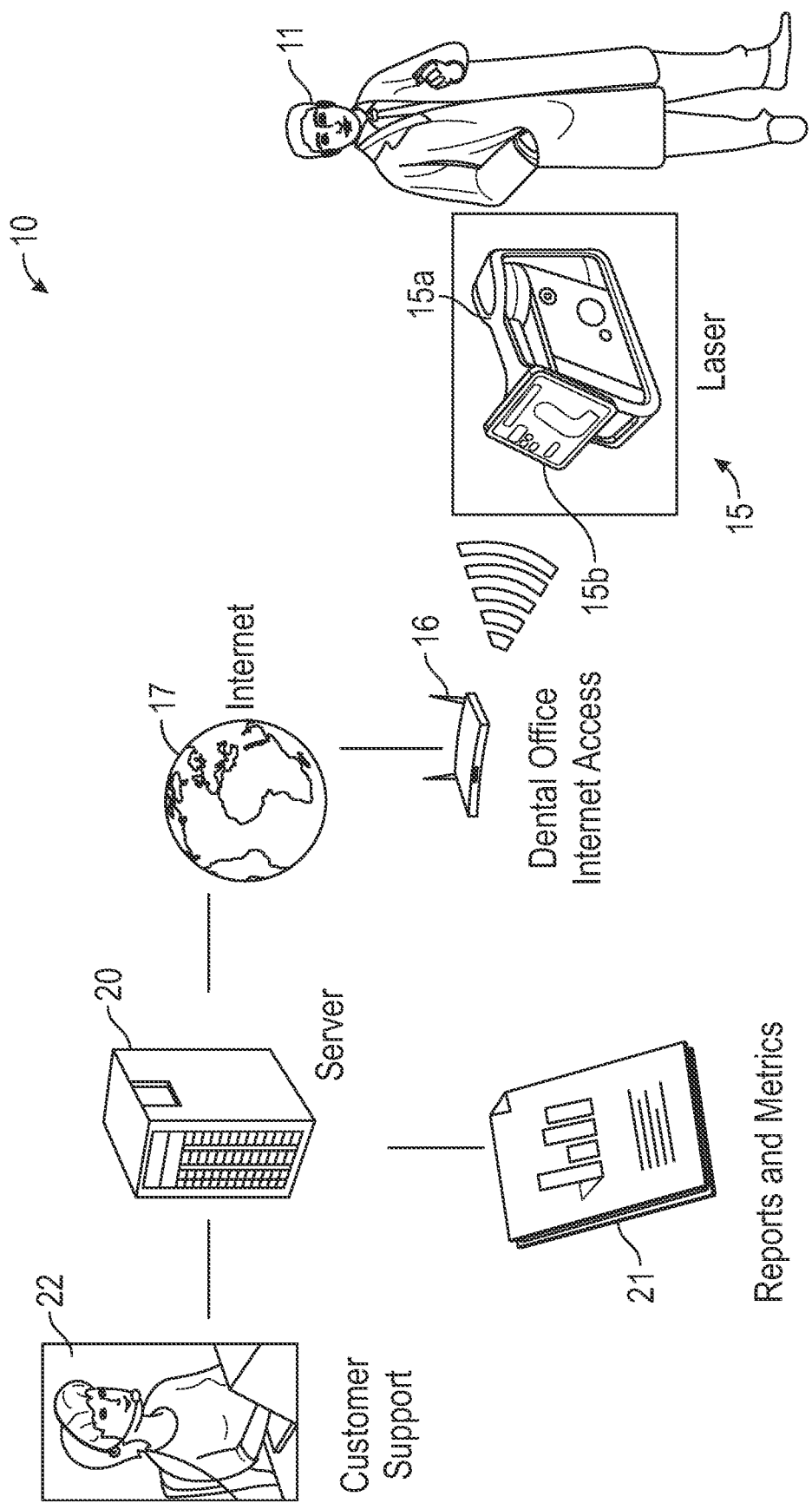
FIG. 1 is a perspective view of remote access system according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, abbreviations can include an automatic update server ("AUS"), system provider laser database ("BLD"), session and log information parser ("SLIP"), tablet software component ("TSC"), web query interface ("WQI"), and web portal server ("WPS").

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 is a perspective view of remote access system 10 according to some embodiments of the invention. Some embodiments include a remote access system 10 that can include several components that interact together to acquire data from one or more system provider laser systems operated by one or more users 11. In some embodiments, the remote access system 10 can allow users 11 faster and easier access to support and update content of a dental laser. For example, some embodiments include a remote access system 10 that can provide trend analysis of field usage. In some embodiments, the remote access system 10 can include a coupled dental laser that includes wireless communication circuitry. For example, in some embodiments, the system is designed to work with any network capable dental laser systems such as a dental laser station 15. In some embodiments, the power supply and control module of the dental laser station 15 can include wireless communication circuitry to receive a signal to communicate with a network 17 (e.g., the internet) through a wireless or wired access point (e.g., such as internet access point 16).

In some embodiments of the invention, the dental laser station 15 can include a dental laser device 15a that includes a display 15b. In some embodiments of the invention, the display 15b can include a graphical user interface (hereafter "GUI") comprising one or more displayed menus that can be navigated by user to control or monitor one or more functions of a dental laser station 15. In some embodiments of the invention, the displayed menus can include category buttons, any one of which can have one or more control system attributes. These category buttons may be defined as, but not limited to, dentin, enamel, anterior deciduous, hemostasis, perio, endo, incision/excision, de-sensitization and osseous. In some embodiments, the display 15b can comprise "soft" buttons that can be graphically rendered in a GUI, and/or can be hard buttons located adjacent the displays on a dental tool or associated control equipment, and/or a remote control or a WiFi linked system (e.g., such as a network 17 coupled to one or more servers 20 through internet access point 16).

In some embodiments, the display 15b can comprise a touchscreen display. For example, in some embodiments, the display 15b can comprise a touchscreen display configured to enable users 11 to interact with the displayed GUI. In some embodiments, user interactions with the GUI can include contact of at least a portion of the display 15b to initiate or represent an input to the display 15b and/or an input or selection of any information within the display or GUI. For example, in some embodiments, one or more users, using single, multiple, or repeated physical contact with the display 15b can initiate one or more functions of the dental laser station 15. In some embodiments, using one or more portions of the GUI, users 11 can enter, select, and/or modify one or more system or operational variables or attributes of the dental laser station 15. For example, using at least one displayed feature, users 11 can use the GUI to control a plurality of system or operational variables or attributes of the dental laser 15a. In some embodiments, these parameters can be modified interactively to adjust and optimize the operational characteristics of a dental laser 15a prior to starting a dental procedure, during a dental procedure, and/or after a dental procedure has been performed.

In some embodiments, the dental laser 15a can include laser sources including one or more lasers, or two or more different lasers. In some embodiments, lasers can be laser diodes, or other sources of light. In some embodiments, the laser sources can include an erbium, yttrium, aluminum garnet (Er:YAG) solid state laser; a chromium, thulium, erbium, yttrium, aluminum garnet (CTE:YAG) solid state laser; an erbium, yttrium orthoaluminate (Er:YAL03) solid state laser; a holmium, yttrium, aluminum garnet (Ho:YAG) solid state laser; a quadrupled neodymium, yttrium, aluminum garnet (quadrupled Nd:YAG) solid state laser; an excimer laser; or a carbon dioxide ($CO_2$) laser. In some further embodiments of the invention, the dental laser can include one or more erbium, chromium, yttrium, scandium, gallium garnet lasers (Er:Cr:YSGG).

In some embodiments of the invention, the power supply and/or control module of the dental laser station 15 can include wireless communication circuitry to receive a signal to communicate with a wireless remote control. For example, in some embodiments, the wireless remote control can be used to actuate a laser output of a handpiece assembly of the dental laser station 15 (e.g., such as the handpiece assembly 200 shown in FIGS. 8B, 8D, and 8E). Further, in some embodiments, the wireless remote control can be used to send various control signals from the power supply and control module to the handpiece assembly, or otherwise control one or more operations of the handpiece assembly (e.g., such as handpiece assembly 200).

In some embodiments, the wireless remote control can be, in a non-limiting example, a smartphone or a tablet computer that is able to communicate wirelessly with the wireless communication circuitry. In some embodiments, the dental laser station 15 can include a removable conventional tablet computer. In some embodiments, the dental laser station 15 can include a mounting point for a conventional tablet that can be coupled to a cart and/or mounted to a table. In some embodiments, the display 15b can comprise a tablet display. In some embodiments, the tablet display can be used as a training and/or educational tool (e.g., for use as a display for educational videos and/or training materials including text, images, and/or video). Any of the educational videos and/or training materials can include accompanying sound that can be played through the tablet display or other audio-capable component coupled to the dental laser station 15. In some further embodiments, the tablet can be used as a communication tool. In some embodiments, users 11 can communicate to and/or from another user, a trainer, a doctor or dentist, and/or one or more patients using the tablet.

Some embodiments include a remotely accessible system where the remote access system 10 can receive session and log data from any wired or wireless coupled system at a specific time and/or at specific time intervals. For example, some embodiments include a remote access system 10 where the system receives one or more session and log data from any coupled system about twice per week. In some embodiments, the frequency can vary based on one or more user settings, or the remote access system 10 can set or vary the frequency based on one or more parameters of the remote access system 10. In some embodiments of the invention, the session data can include information related to one or more procedures, and/or settings information, and/or errors, as well as time spent firing the laser. In some embodiments, the log data can include all events (screen presses, etc.) in addition to raw communication data. In some embodiments, reports and metrics 21 of the remote access system 10 can include any of the session data described.

Some embodiments include a remote access system 10 that can receive intermediate data via a "Help Me Now" feature which appends a current log file and that is sent to a system provider. In some embodiments, other data can be sent or received and appended to the log file based on any system input or output. Some embodiments include a remote access system 10 that includes a remote access feature which allows real time access to any coupled laser system (e.g., such as dental laser station 15).

Some embodiments include a remote access system 10 that allows download of updated training materials, videos, software, and firmware updates over the air (e.g., through internet access point 16). Some embodiments include a remote access system 10 that also includes a user dashboard and discussion forum. In some embodiments, on the system provider side, some embodiments include a remote access system 10 that allows all received data to be queried arbitrarily for data mining and analysis purposes as well as review of device or user history.

In some embodiments of the invention, the remote access system 10 can function to address various system provider remote access requirements. For example, in some embodiments, the remote access system 10 can provide access to field data for error analysis and usage trending. Further, some embodiments of the invention can enable near instantaneous customer support features (shown as 22).

In some embodiments of the invention, the remote access system 10 can provide automated alerts when any component or system of the remote access system 10 experiences an error. In some further embodiments of the invention, the remote access system 10 can provide automated software and content updates (e.g., from one or more servers 20). In some embodiments, one or more system or software updates can be uploaded or downloaded through a wired and/or wireless connection of the remote access system 10 (e.g., from the network 17). For example, in some embodiments, remote access system 10 can receive at least one automated software and content update via an internet connection (network 17) that is enabled using a wired and/or wireless connection (internet access point 16).

Figure 2:
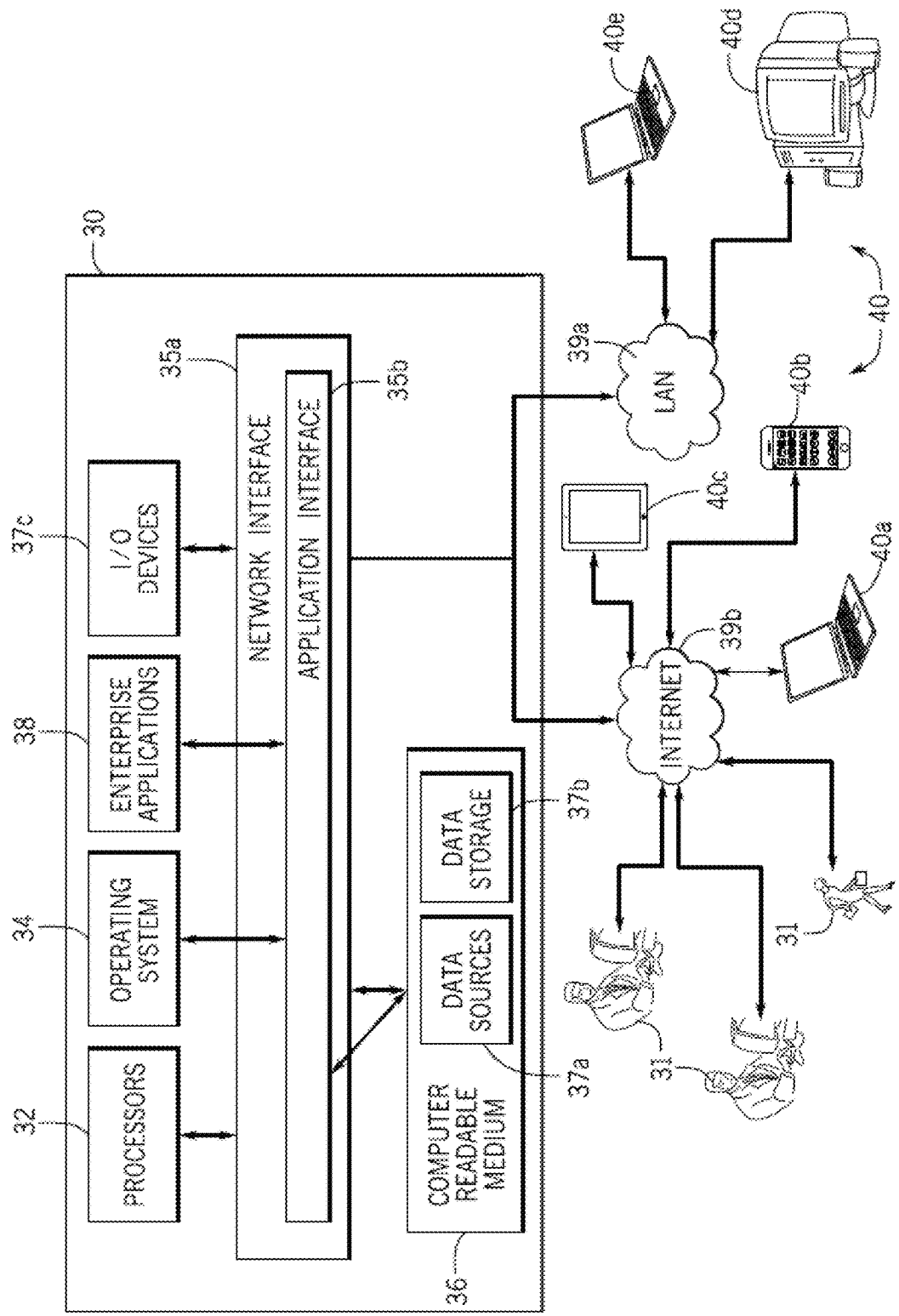
FIG. 2 illustrates a system architecture for operating the remote access system illustrated in FIG. 1.

FIG. 2 illustrates a computer system 30 useful for operating the remote access system 10 illustrated in FIG. 1 in accordance with some embodiments of the invention. In some embodiments, the system 30 can control one or more components or systems of a dental laser station including any operation portion of a remote access function of the dental laser station. In some embodiments of the invention, the system 30 can comprise operating and processing modules for operating the remote access system 10. In some embodiments, using the system 30, the remote access system 10 can manage the organization of data and data flow between the various components of a dentistry control system of the dental laser station 15 and system 10. For example, in some embodiments, the one or more servers 20 can comprise one or more components of the system 30.

In some embodiments, the system 30 can include at least one computing device including one or more processors 32. Some processors 32 can include processors residing in one or more conventional server platforms including within a cloud of computing resources. In some embodiments, the system 30 can include a network interface 35a and/or an application interface 35b coupled to at least one processor 32 capable of running at least one operating system 34. Further, in some embodiments, the processor(s) 32 can be capable of running one or more of the software modules (e.g., such as enterprise applications 38). In some embodiments, the system 30 can comprise at least one computer readable medium 36 coupled to at least one data storage device 37b, and/or at least one data source 37a, and/or at least one input/output device 37c. In some embodiments, the computer readable medium 36 can be any data storage device that can store data, which can thereafter be read by a computer system (such as the system 30). Examples of the computer readable medium 36 can include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor (including processors 32).

Some embodiments include a remote access system 10 embodied as computer readable code on the computer readable medium 36. In some embodiments of the invention, the computer readable medium 36 can also be distributed over a conventional computer network via the network interface 35a so that the computer readable code can be stored and executed in a distributed fashion. For example, in some embodiments, one or more components of the system 30 can be tethered to send and/or receive data through a local area network ("LAN") 39a. In some further embodiments, one or more components of the system 30 can be tethered to send or receive data through an internet 39b (e.g., a wireless internet). Further, in some embodiments, at least one software application 38 running on one or more processors 32 can be configured to be coupled for communication over a network 39a, 39b. In some embodiments, one or more components of the network 39a, 39b can include one or more resources for data storage, including any other form of computer readable media beyond the media 36 for storing information and including any form of computer readable media for communicating information from one electronic device to another electronic device.

In some embodiments, the network 39a, 39b can include wide area networks ("WAN"), direct connections (e.g., through a universal serial bus port) or other forms of computer-readable media 36, or any combination thereof. Further, in some embodiments, one or more components of the network 39a, 39b can include a number of client devices which can be one or more computers 40 including for example desktop computers 40d, laptop computers 40a, 40e, digital assistants and/or personal digital assistants (shown as 40c), cellular phones or mobile phones or smart phones (shown as 40b), pagers, digital tablets, internet appliances, and other processor-based devices. Further, in some embodiments, the dental laser station 15 can comprise or include the one or more computers 40. In general, a client device can be any type of external or internal devices such as a conventional mouse, CD-ROM, DVD, keyboard, display, or other input or output devices 37c (including for example the display 15b or other coupled peripherals).

In some further embodiments, various other forms of computer-readable media 36 can transmit or carry instructions to one or more computers 40, including a router, private or public network, or other transmission device or channel, both wired and wireless. In some embodiments, the software modules 38 can be configured to send and receive data from a database (e.g., from a computer readable medium 36 including data sources 37a and data storage 37b that can comprise a database), and data can be received by the software modules 38 from at least one other source. In some embodiments, at least one of the software modules 38 can be configured within the system 30 to output data to at least one user 31 via at least one digital display (e.g., to a computer comprising a digital display). In some embodiments, the at least one user 31 can be a customer support 21 and/or one or more users 11. In some embodiments, the non-transitory computer-readable storage medium 36 includes a dental laser management process executable by the processors 32 that can manage exchange of at least one dentistry-related parameter between the dental laser station 15 or one or more components coupled to the dental laser station (e.g., such as the handpiece assembly 200) and a remote network (e.g., such as the network 17).

In some embodiments, the system 30 as described can enable one or more users 31 to receive, analyze, input, modify, create and send data to and from the system 30, including to and from one or more enterprise applications 38 running on the system 30. Some embodiments include at least one user 31 coupled to a computer 40 accessing one or more modules of the dentistry control system including at least one enterprise applications 38 via a stationary I/O device 37c through a LAN 39a. In some other embodiments, the system 30 can enable at least one user 31 (through computer 40) accessing enterprise applications 38 via a stationary or mobile I/O device 37c through an internet 39a. In some embodiments, the software modules 38 can include a server-based software platform that can include dentistry control software modules suitable for hosting at least one user account and/or at least one patient account or record. In some embodiments, using the system 30, the dentistry control system can manage multiple user accounts and/or multiple patient accounts.

In some embodiments of the invention, one or more components of the remote access system 10 (e.g., such as a dental laser systems that include the dental laser station 15) can include an interface for the user to couple to a Wi-Fi network including a web portal for users to share information and best practices. In some further embodiments of the invention, the remote access system 10 can integrate with system provider systems for automated ordering, etc. (e.g., such as CRM and ERP order management systems) (e.g., through one or more servers 20). In some further embodiments of the invention, the remote access system 10 can scale to support all future system provider web-enabled laser systems.

In some embodiments, at least one of the software modules of the remote access system 10 can comprise a tablet software component (TSC), and/or a session and log information parser (SLIP), and/or a system provider laser database (BLD), and/or a web query interface (WQI), and/or an automatic update server (AUS), and/or a web portal server (WPS), ERP/CRM integration interface. Some embodiments include a log and session interface specification as defined in one or more portions of the software. In some embodiments, the TSC can provide a notification to SLIP when critical errors are encountered. In some further embodiments, the TSC can provide a mechanism to transfer log and session data from the laser system to SLIP on a regular basis. In some embodiments, the TSC shall prevent duplicate information from being transferred to SLIP. In some further embodiments, the TSC shall provide an interface to receive updates from AUS. In some further embodiments, the TSC shall provide an interface to send immediate help requests to SLIP. In some other embodiments, the TSC shall provide an interface to interact with the system provider web portal server. In some embodiments, the TSC shall provide an interface to update user settings to the system provider SLIP server. In some embodiments, the TSC shall provide an interface to restore user settings from the system provider SLIP server. In some embodiments, the TSC shall provide the ability to respond to remote access system 10 server requests to read and write hardware register values on the host laser system. In some embodiments, the TSC provides the ability to view a remote access system 10 hosted user dashboard that shows procedure settings used, user tips and notes, time to completions, and changes over time. In some embodiments, the TSC provides an interface to support auto-reorder of consumables (tips). In some embodiments, the TSC provides an interface to support video chat when selected from the "Help Me Now" feature.

Some embodiments include a session and log information parser (SLIP). In some embodiments, the SLIP can be the entry point for data from the fielded laser systems. In some embodiments, the SLIP can implement various operation procedures in the remote access system 10. For example, in some embodiments, the SLIP shall receive compressed log and session files from any system provider web connected laser system. In some embodiments of the invention, the SLIP can include parse the files for duplicate information and discard duplicate data. In some further embodiments, the SLIP can include date concatenate all log files from the same laser system. In some other embodiments, the SLIP can enter all parsed data into the BLD. In some embodiments of the invention, the SLIP can receive notices of critical errors and send notices to registered system provider representatives. In some embodiments, the SLIP can provide a configuration utility to allow setting up critical error notification lists. In some embodiments, the SLIP can provide a log capability. In other embodiments, the SLIP can provide a mechanism to save user settings files and restore them to a user system upon request.

Some embodiments include a system provider laser database (BLD). In some embodiments, the servers 20 can include the BLD. In some embodiments, the BLD contains all the data collected from the fielded laser systems. In some embodiments of the invention, the BLD can allow new records to be created from SLIP. In some embodiments, the BLD can mark all SLIP created records as read-only. In some further embodiments, the BLD can provide read-only access to the web query interface. In some further embodiments, the BLD can allow new queries to be generated. In some further embodiments, the BLD shall provide a user and administrator level login. In some embodiments, the BLD can allow new records to be created by administrators only. In some embodiments of the invention, the BLD can support saving user dashboard data including procedure settings, and/or times, and/or user notes. In some embodiments, the BLD can support integration of training levels (e.g. none, bronze, silver, gold) from tablet, classroom, and online training for user profiles.

Some embodiments include a web query interface (WQI). In some embodiments, the web query interface can allows users 11 (or customer support 22) to log in and perform searches and pre-canned reports against the BLD. The web query interface shall implement the following requirements: The WQI client shall run on any conventional operating system. The WQI shall provide user and administration log in capability. In some embodiments, the WQI shall provide searches and reports for device history by serial number, error count by type, and procedure count by type.

In some embodiments of the invention, the WQI can provide access to develop additional queries and reports. In some embodiments, the development of additional reports and queries can require administrator privilege. Some embodiments include an automatic update server (AUS). In some embodiments, the AUS can be responsible for sending new content, software, and firmware updates to any system provider web connected laser system. The AUS can implement the following requirements: The AUS can provide an interface to be notified of new updates released from system provider, including which devices are affected. In some embodiments, the AUS shall respond to update requests from system provider web connected laser systems and download any applicable new updates automatically. In some embodiments, the download does not automatically install the update. In some embodiments of the invention, the AUS can provide a mechanism to unlock new procedures/features to a specific system provider web connected laser system upon authorization. In some embodiments, the AUS can provide a mechanism to update video or help content separately from software updates. In some embodiments, the AUS can provide a log of all devices that received each update, and transfer the data to the BLD automatically.

Some embodiments include a web portal server (WPS). In some embodiments, the WPS can be responsible for maintaining the user community portal that can be accessed on each system provider web connected laser system. In some embodiments, the WPS can implement the following requirements: The WPS can provide a user portal area with access to system provider content and a user forum. The WPS can provide a means to automatically update content such as "marketing tip of the week" or "tutorial of the week". The WPS can require authentication from a system provider web connected laser system before allowing content to be streamed. The WPS can be designed to allow new features to be added easily. The WPS can support display of user trend data including procedure settings, time, user notes, and render these as changes/improvements over time. The WPS can support display of a user's training level "badge" as reported from the database via an icon or other representation on each post I profile.

Some embodiments include an ERP I CRM communication interface. In some embodiments, this feature can allow automated sales and update data to be pulled from and entered into the appropriate ERP/CRM system. In some embodiments, the ERP/CRM interface can support submission of tip reorders when received by the remote access system 10 from a connected laser system.

Some embodiments of the invention include a video chat interface. In some embodiments, this feature can allow incoming video chats to be routed to the appropriate remote access system 10 user. In some embodiments, the remote access system 10 user profile can support a video chat user option that may be selected in conjunction with any other role. Some further embodiments include a video chat interface that can receive incoming video calls from a connected laser system and route them to logged in users who have video reception enabled.

In some embodiments, the remote access system 10 can provide various remote access features specifications, including, but not limited to, laser settings, sensors, output, log and calibration data. For example, in some embodiments, the system information can comprise one or more parameters shown in Table 1 below:

TABLE 1

System information parameters

| Field Name | Description | Type |
| --- | --- | --- |
| Laser Serial Number | Numeric | Read Only |
| Tablet Serial Number | Numeric | Read Only |
| Software Version | Numeric | Read Only |
| Firmware Version | Numeric | Read Only |
| launcher Version | Numeric | Read Only |
| Fiber Serial Number | Numeric | Read Only |
| Fiber Pulse Count | Numeric | Read Only |
| Fiber Rework Count | Numeric | Read Only |
| System State | Numeric, translate to Standby, Ready, Firing, Sleep, Disconnected, or Error | Read Only |

In some embodiments, the remote access system 10 can provide one or more laser setting parameters as shown and described in Table 2:

TABLE 2

Laser system parameters

| Field Name | Description | Type |
| --- | --- | --- |
| Illumination | PWM (0 to 100) | Read/Write |
| Aiming Beam | PWM (0 to 100) | Read/Write |
| Patient Air | PWM (0 to 100) | Read/Write |
| Patient Water | PWM (0 to 100) | Read/Write |
| Laser Power | Numeric, 0 to 4.0 | Read/Write |
| Laser PPS | Numeric, allowed values 10, 15, 20, 25, 30, 35, 40, 45, 50 only | Read/Write |
| Laser Mode | Binary (H or S) | Read/Write |

In some embodiments, one or more parameters can be updated, viewed, or modified by the remote access system 10. Further, in some embodiments, one or more of the parameters can include one or more presets of a dental laser system, including, but not limited to tip and tip type options, laser power, pulse frequency, laser energy, and air and water delivery options and levels. For example, some parameters that can be updated, viewed, or modified by the remote access system 10 include parameters that form part of options of steps (shown as "Level 2"), forming part of a procedure present (shown as "Level 1"), where each procedure can be assigned as a treatment category (shown as "Level 0"). For example, some embodiments are shown in Tables 3-7 below. For example, some parameters that can be updated, viewed, or modified by the remote access system 10 include restorative categories, procedures, options/steps (shown in Table 3), and/or soft tissue categories, procedures, options/steps (shown in Table 4), perio categories, procedures, options/steps (shown in Table 5), implant categories, procedures, options/steps (shown in Table 6), and endo categories, procedures, options/steps (shown in Table 7).

TABLE 3

Restorative categories, procedures, options/steps

| Level 0 Categories | Level 1 Procedures | Level 2 Options/Steps |
|---|---|---|
| Restorative | Class 1-2 (A) | ComfortPrep |
|  |  | BondPrep |
|  |  | Pulp Cap |
|  | Class 3 | ComfortPrep |
|  |  | BondPrep |
|  | Class 4 | ComfortPrep |
|  |  | BondPrep |
|  | Class 5 | Hemostatic Gingivectomy |
|  |  | ComfortPrep |
|  |  | BondPrep |
|  | Deciduous | ComfortPrep Class 1 |
|  |  | ComfortPrep Class 2 |
|  |  | BondPrep |
|  |  | Pulp Cap |
|  |  | Pulpotomy |

TABLE 4

Soft tissue categories, procedures, options/steps

| Level 0 Categories | Level 1 Procedures | Level 2 Options/Steps |
|---|---|---|
| Soft Tissue | Maxillary Frenectomy | Comfort Cut |
|  |  | Rapid Cut* |
|  |  | Hemostasis |
|  | Lingual Frenectomy | Comfort Cut |
|  |  | Rapid Cut* |
|  |  | Hemostasis |
|  | Biopsy | Comfort Cut |
|  |  | Rapid Cut* |
|  |  | Hemostasis |
|  | Gingivectomy | Comfort Cut |
|  |  | Rapid Cut* |
|  | Gingivoplasty | Comfort Cut |
|  |  | Rapid Cut* |
|  | Troughing | Rapid Cut* |
|  |  | Hemostasis |

TABLE 5

Perio categories, procedures, options/steps

| Level 0 Categories | Level 1 Procedures | Level 2 Options/Steps |
|---|---|---|
| Perio | REPAIR | Outer De-epithelialization |
|  |  | Gingivectomy |
|  |  | Inner De-epi/Granulation removal |
|  |  | Root Debridement |
|  |  | Decortication |
|  |  | Final Debridement |
|  | Open Flap for Perio Pathology | Outline |
|  |  | Outer De-epithelialization |
|  |  | Incision |
|  |  | Laser Assisted Flap Reflection |
|  |  | Secondary Incision |
|  |  | Degranulation and Collar Removal |
|  |  | Root Surface Modification |
|  |  | Ostectomy |
|  |  | Osteoplasty |
|  | Osseous CL Closed | Outline |
|  |  | Gingivectomy |
|  |  | Ostectomy |
|  |  | Osteoplasty |
|  |  | Gingivoplasty |

TABLE 5-continued

Perio categories, procedures, options/steps

| Level 0 Categories | Level 1 Procedures | Level 2 Options/Steps |
|---|---|---|
|  | Osseous CL Open | Outline |
|  |  | Incision |
|  |  | Laser Assisted Flap Reflection |
|  |  | Secondary Incision |
|  |  | Degranulation and Collar Removal |
|  |  | Ostectomy |
|  |  | Osteoplasty |
|  | Flap Surgery | Outline |
|  |  | Incision |
|  |  | Laser Assisted Flap Reflection |
|  |  | Secondary Incision |
|  |  | Degranulation and Collar Removal |
|  | Non-surgical Periodontal Therapy | Inner De-epithelization |
|  |  | Pocket Debridement |

TABLE 6

Implant categories, procedures, options/steps

| Level 0 Categories | Level 1 Procedures | Level 2 Options/Steps |
|---|---|---|
| Implant | Implant Uncovering | Outline |
|  |  | Incision (near Implant)* |
|  |  | Osseous Access |
|  |  | Emergence Profile |
|  | Socket Debridement | Decontamination |
|  |  | Outer De-epithelialization |
|  |  | Decortication |
|  | REPAIR | Outer De-epithelialization |
|  |  | Gingivectomy |
|  |  | Pocket Debridement |
|  |  | Implant Decontamination |
|  |  | Decortication |
|  |  | Final Debridement |
|  | Open Flap Implant | Outline Incision |
|  |  | Outer De-epithelialization |
|  |  | Incision (near bone) |
|  |  | Laser Assisted Flap Reflection |
|  |  | Degranulation |
|  |  | Implant Decontamination |
|  |  | Decortication |
|  | Maxillary Window (A) | Incision (near bone) |
|  |  | Ostectomy* |

TABLE 7

Endo categories, procedures, options/steps

| Level 0 Categories | Level 1 Procedures | Level 2 Options/Steps |
|---|---|---|
| Endo | Root Canal | Clean and Shape |
|  |  | Disinfection |
|  | Apicoectomy | Flap |
|  |  | Osseous Access |
|  |  | Degranulation |
|  |  | Root Amputation |
|  |  | Bone Debridement |
|  | Pulp Cap | Pulp Cap |
|  | Pulpotomy | Partial Pulpotomy |
|  |  | Pulpotomy |

In some embodiments, the remote access system 10 can provide one or more sensors as shown and described in Table 8:

TABLE 8

Sensors of the remote access system

| Field Name | Description | Type |
| --- | --- | --- |
| High Voltage Temp | Binary (Enabled/Disabled) | Read Only |
| Shutter Sensor 1 | Binary (Enabled/Disabled) | Read Only |
| Shutter Sensor 2 | Binary (Enabled/Disabled) | Read Only |
| Simmer Monitor | Binary (Enabled/Disabled) | Read Only |
| Emergency Stop | Binary (Enabled/Disabled) | Read Only |
| Front Button | Binary (Enabled/Disabled) | Read Only |
| 3.3 V Monitor | Numeric | Read Only |
| 5 V Monitor | Numeric | Read Only |
| 12 V Monitor | Numeric | Read Only |
| 24 V Monitor | Numeric | Read Only |
| Water Temp | Numeric | Read Only |
| HV Feedback | Numeric | Read Only |
| HV Capacitor | Numeric | Read Only |
| Water Bottle Reservoir Level | Binary | Read Only |
| Flashlamp Status | Binary | Read Only |
| Water Flow | Binary (On/Off) | Read Only |
| Patient Bottle Air Valve Status | Binary (On/Off) | Read Only |
| Patient Air HP Cool Valve Status | Binary (On/Off) | Read Only |
| Remote Interlock | Binary (Enable/Disable) | Read Only |
| Patient Bottle Sensor 1 | Binary (Enable/Disable) | Read Only |
| Patient Bottle Sensor 2 | Binary (Enable/Disable) | Read Only |
| Patient Air Status | Binary (On/Off) | Read Only |
| Patient Water Status | Binary (On/Off) | Read Only |
| Input Air Pressure Sensor 1 | Binary (On/Off) | Read Only |
| Input Air Pressure Sensor 2 | Binary (On/Off) | Read Only |

In some embodiments, the remote access system 10 can provide one or more output parameters as shown and described in Table 9:

TABLE 9

Output parameters

| Field Name | Description | Type |
| --- | --- | --- |
| Power Supply Ready | Binary (Enable/Disable) | Read/Write |
| Water Pump Enable | Binary (Enable/Disable) | Read/Write |
| Bottle Air Valve | Binary (Enable/Disable) | Read/Write |
| Handpiece Air Cool Valve | Binary (Enable/Disable) | Read/Write |
| Illumination Enable | Binary (Enable/Disable) | Read/Write |
| USB Reset | Binary (Enable/Disable) | Read/Write |
| Simmer Enable | Binary (Enable/Disable) | Read/Write |
| Buzzer | Binary (Enable/Disable) | Read/Write |
| Fan Control | PWM (0 to 100) | Read/Write |
| Ready LED | Binary (Enable/Disable) | Read/Write |
| Standby LED | Binary (Enable/Disable) | Read/Write |
| Communication LED | Binary (Enable/Disable) | Read/Write |
| Footswitch LED | Binary (Enable/Disable) | Read/Write |

In some embodiments, the remote access system 10 can provide log and calibration data as shown and described in Table 10:

TABLE 10

Log and calibration data

| Field Name | Description | Type |
| --- | --- | --- |
| Firmware Log | Scrollable text box | Read Only |
| Firmware ELH Log | Scrollable text box | Read Only |
| Laser Calibration Data | Scrollable text box | Read Only |
| Air Calibration Data | Scrollable text box | Read Only |
| Water Calibration Data | Scrollable text box | Read Only |
| Illumination Calibration Data | Scrollable text box | Read Only |
| Aiming Beam Calibration Data | Scrollable text box | Read Only |
| Fiber Power Frequency Index | Scrollable text box | Read Only |
| Fiber Energy Index | Scrollable text box | Read Only |
| PWB Sensor Calibration Data | Scrollable text box | Read Only |

Some embodiments include an assembly of one or more optical components, and/or arrangements of optical components such as lenses, mirrors, and one or more optical fibers. In some embodiments, one or more of the optical components can be coupled to the dental laser station 15 described earlier. For example, in some embodiments, any of the optical components or optical component layouts can be included as part of a laser handpiece of the dental laser 15a. Some embodiments include an optical scheme for fiber delivery of high power laser radiation from the dental laser 15a. Optical elements can be selected for reliability of the optical surfaces, overall efficiency of laser power transmission, and beam distribution at the operational plane for material cutting. Further, the use of the optical elements as described can minimize overall dimensions to apply for miniature laser accessories, and can be used with two different accessories in two different modes: contact and non-contact with target material. In some embodiments of the invention, the laser handpiece of the dental laser station 15 can comprise the handpiece assembly 200 described below and shown in FIG. 8B and related figures.

Figure 3:
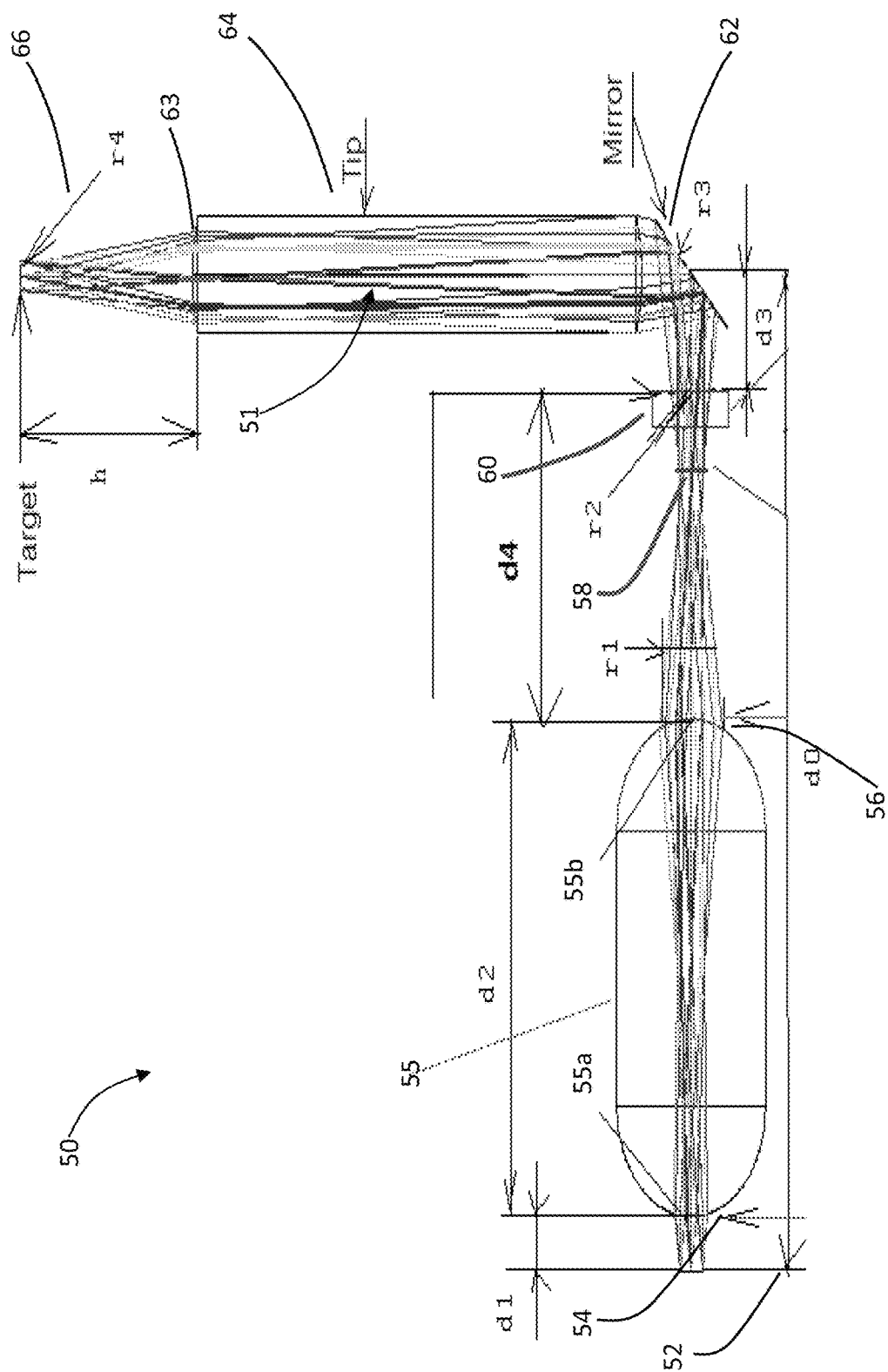
FIG. 3 shows an optical layout schematic in accordance with some embodiments of the invention.

FIG. 3 shows an optical layout schematic 50 in accordance with some embodiments of the invention. Input requirements guiding the design of the optical scheme of the optical layout schematic 50 include the optical surface, exposed to the environment, where laser radiation is emitting that includes power density significantly lower than output surface of fiber delivery system. In some embodiments, the coupling efficiency into all optical elements can be close to 100% (excluding Fresnel losses). Further the laser beam divergence from the final output surface can be very close to (not much bigger than) the original optical fiber. In some embodiments, the laser power distribution within output beam at the target plane can be close to "flat-top" to ensure uniform material removal. In some embodiments, the overall size of the components can be minimal (beam diameter on any surface not to increase 2.5 mm), and the number of optical components can be minimal. In some embodiments, the diameter of the output contact waveguide can be about 0.5 mm to about 0.8 mm.

In some embodiments, there can be two or more types of applied accessories of working in contact with target material, and not in contact, and the optical design can be optimized for both configurations. In some embodiments, the optical scheme be formed of the optical layout schematic 50 that includes fiber distal end position 52, window input position 54, window output position 56, fiber distal end position 58, window position 60, mirror 62, tip 64, and target region 66. In some embodiments, the lens 55 (depicted as fiber lens 185 in FIG. 8A) can include two radii of input and output surfaces, where the beam size on the output surface (shown as 55b) is significantly larger than the beam size from fiber output (shown as 55a). In some embodiments, a protective flat window can be placed after the lens 55 (window output position 56) (and can replaceable in case of damage in some embodiments). Further, in some embodiments, the mirror 62 can turn the beam (shown as ray traces 51) about 90 degrees in the handpiece. Further, in some embodiments, the applied optical waveguide or micro-lens 63 can be a replaceable element and can be exposed to the targeted material.

Figure 4:
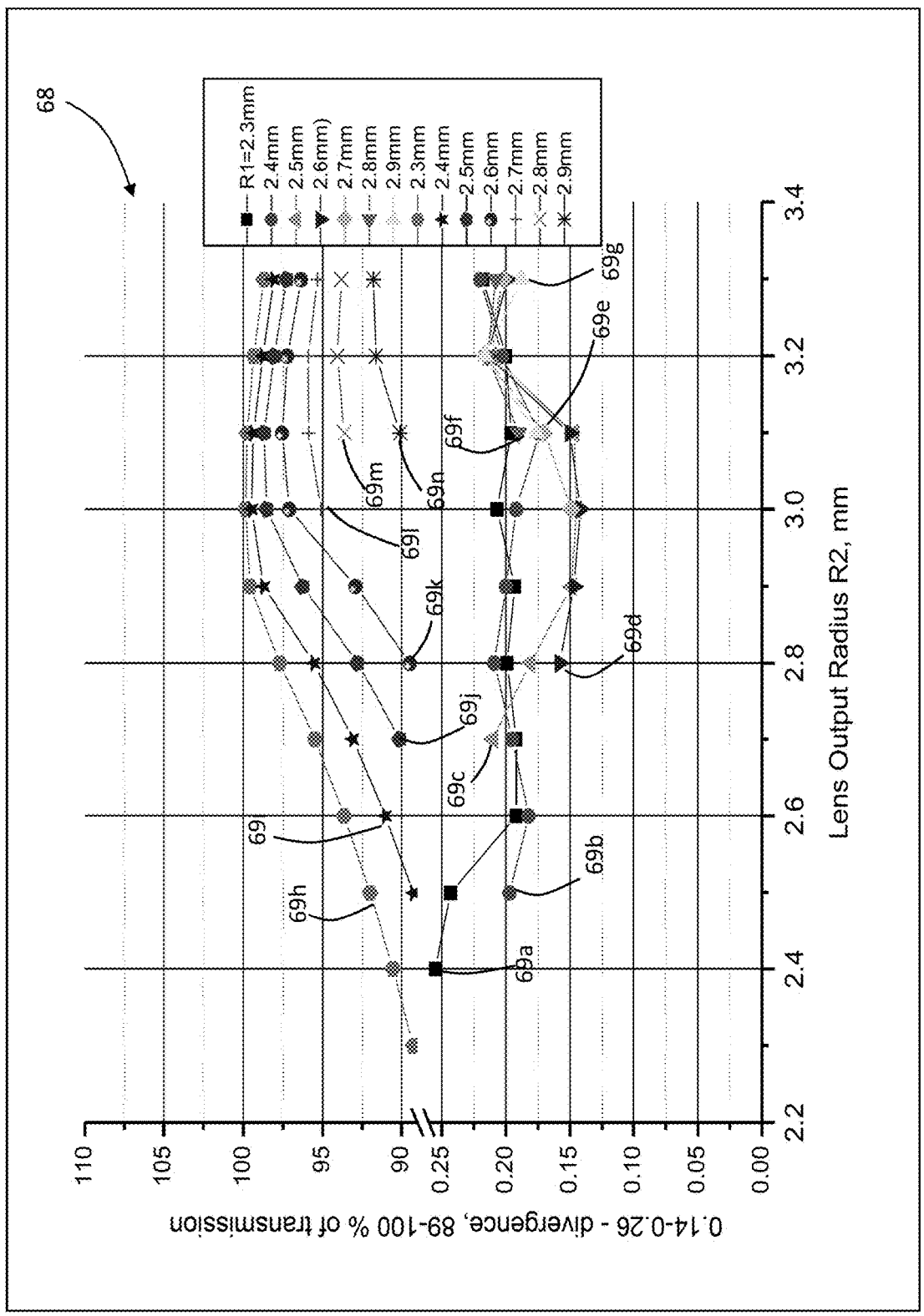
FIG. 4 shows a graph of optical performance versus lens output radius in accordance with some embodiments of the invention.
Figure 5:
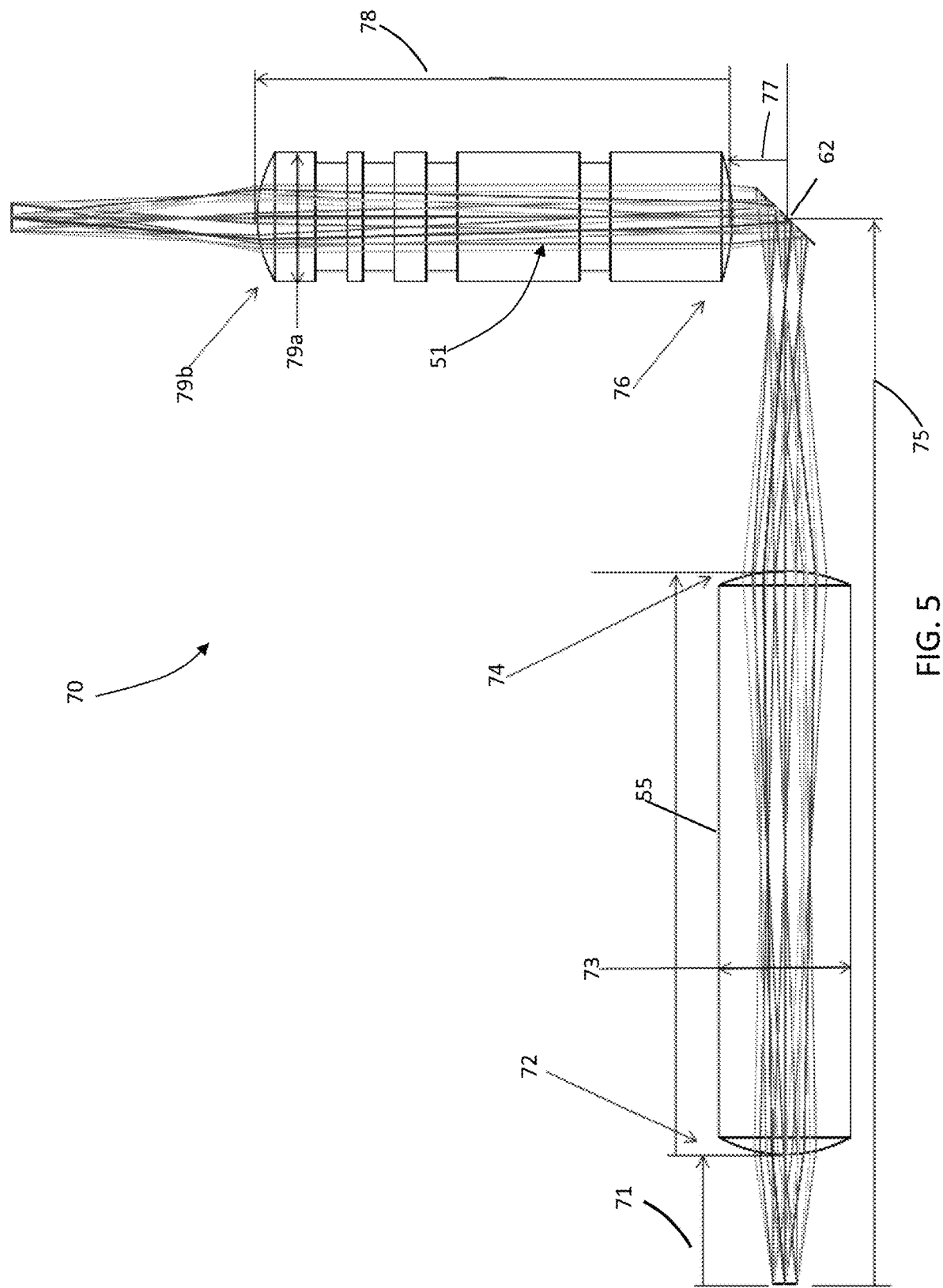
FIG. 5 is a 3D layout of an optical scheme in accordance with some embodiments of the invention.
Figure 6:
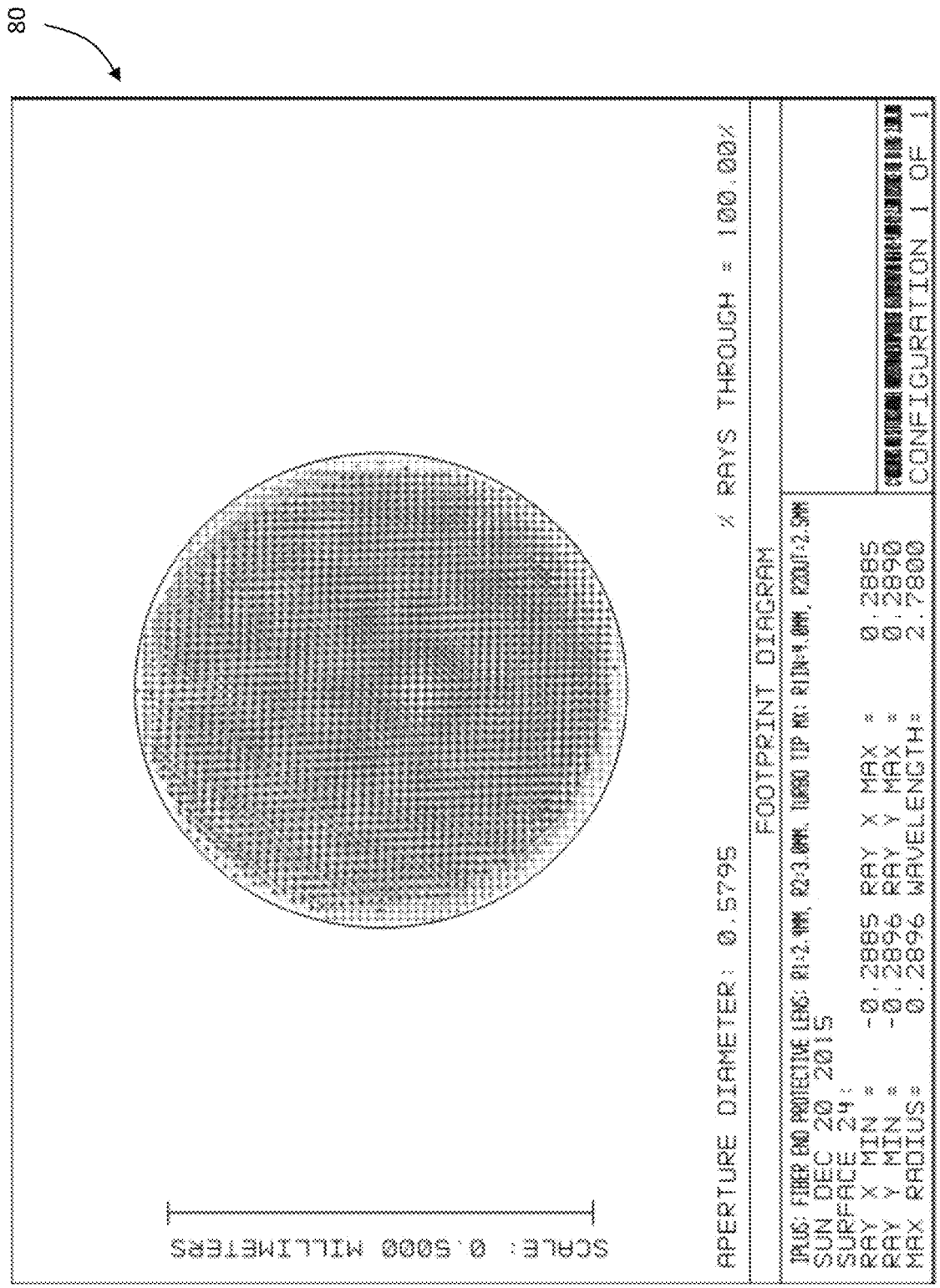
FIG. 6 is a footprint diagram in accordance with some embodiments of the invention.
Figure 7:
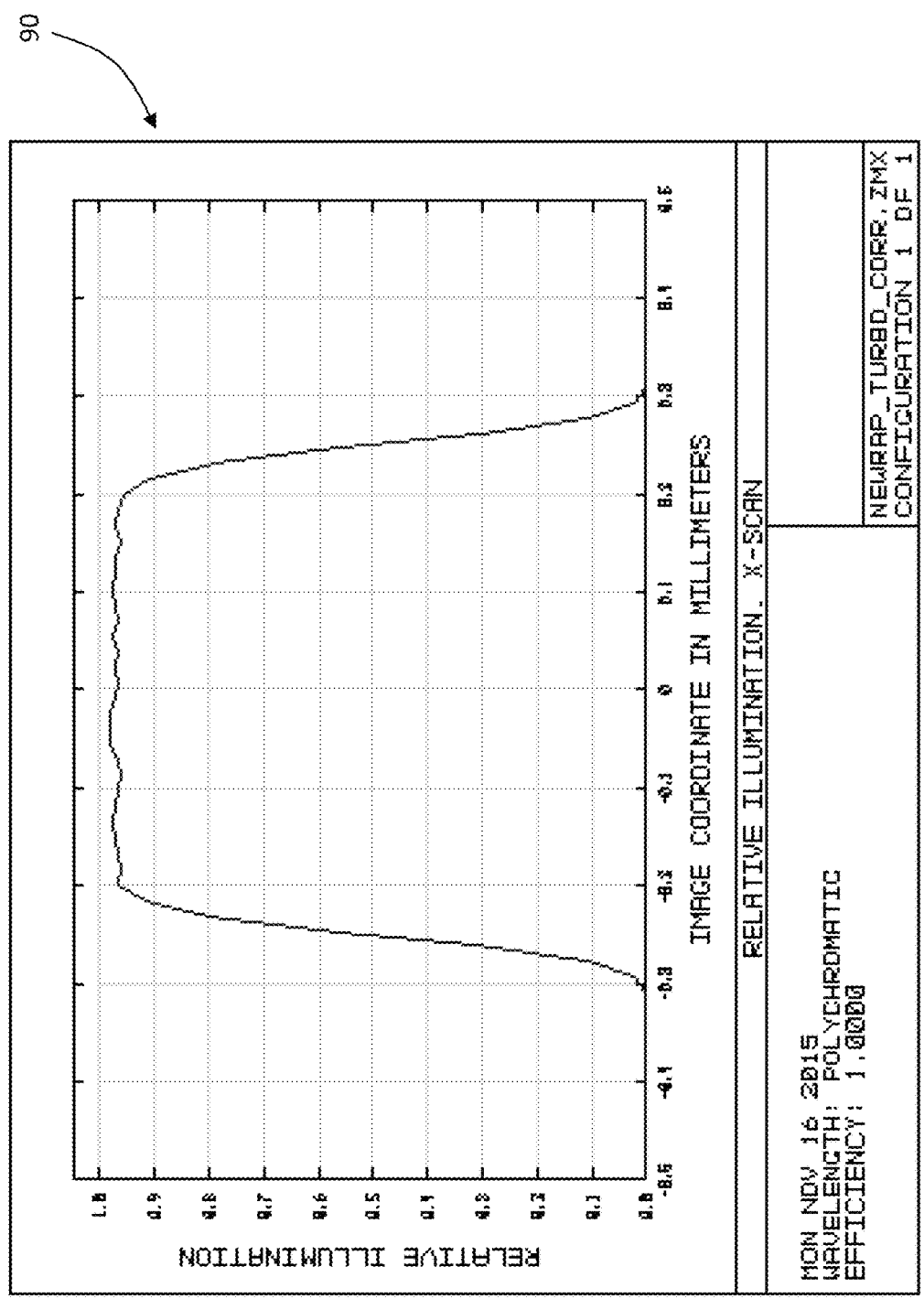
FIG. 7 shows a relative illumination plot in accordance with some embodiments of the invention.

Some results of calculations with optimization that include configurations with a flat/flat output waveguide (optical fiber tip) can provide curvature ranges of both surfaces in the first lens element. For example, FIG. 4 shows a graph 68 of optical performance versus lens output radius (shown as 55b) where the input surface radius "R1" (input surface 55a) in accordance with some embodiments of the invention where R1 is 2.3 mm (plot 69a), R1 is 2.4 mm (plot 69b), R1 is 2.5 mm (plot 69c), R1 is 2.6 mm (plot 69d), R1 is 2.7 mm (plot 69e), R1 is 2.8 mm (plot 69f), R1 is 2.9 mm (plot 69g), R1 is 2.3 mm (plot 69h), R1 is 2.4 mm (plot 69i), R1 is 2.5 mm (plot 69j), R1 is 2.6 mm (plot 69k), R1 is 2.7 mm (plot 69l), R1 is 2.8 mm (plot 69m), R1 is 2.9 mm (plot 69n). Curvatures were checked with configuration of the micro-lens output, and beam distribution was calculated at the focal plane of the output micro-lens, which led to embodiments being substantially optimized at both curved surfaces. Final numbers of the radiuses for first lens were finalized using the optimization calculations (FIGS. 5, 6, and 7). For example, FIG. 5 is a 3D layout of an optical scheme 70 in accordance with some embodiments of the invention. In some embodiments, distance 71 can be 2.5 mm, the radius 72 can be 2.5 mm, the diameter 73 can be 2.5 mm, the radius 74 can be 3 mm, the distance 75 can be 20.66 mm, the radius (inner) 76 can be 4 mm, the distance 77 can be 1 mm, the distance 78 can be 9 mm, the diameter 79a can be 2.5 mm, and the radius (outer) 79b can be 2.5 mm. Further, in some embodiments, the working distance of the optical scheme 70 can be 4.6 mm. In some embodiments, the beam spot diameter on a working surface of the optical scheme 70 is 0.58 mm. FIG. 6 is a footprint diagram 80 in accordance with some embodiments of the invention. FIG. 7 shows a relative illumination plot 90 in accordance with some embodiments of the invention. One of ordinary skill in the art can recognize that any of the dimensions can include some variation based on manufacturing tolerances that do not significantly affect the optical performance.

Figure 8A:
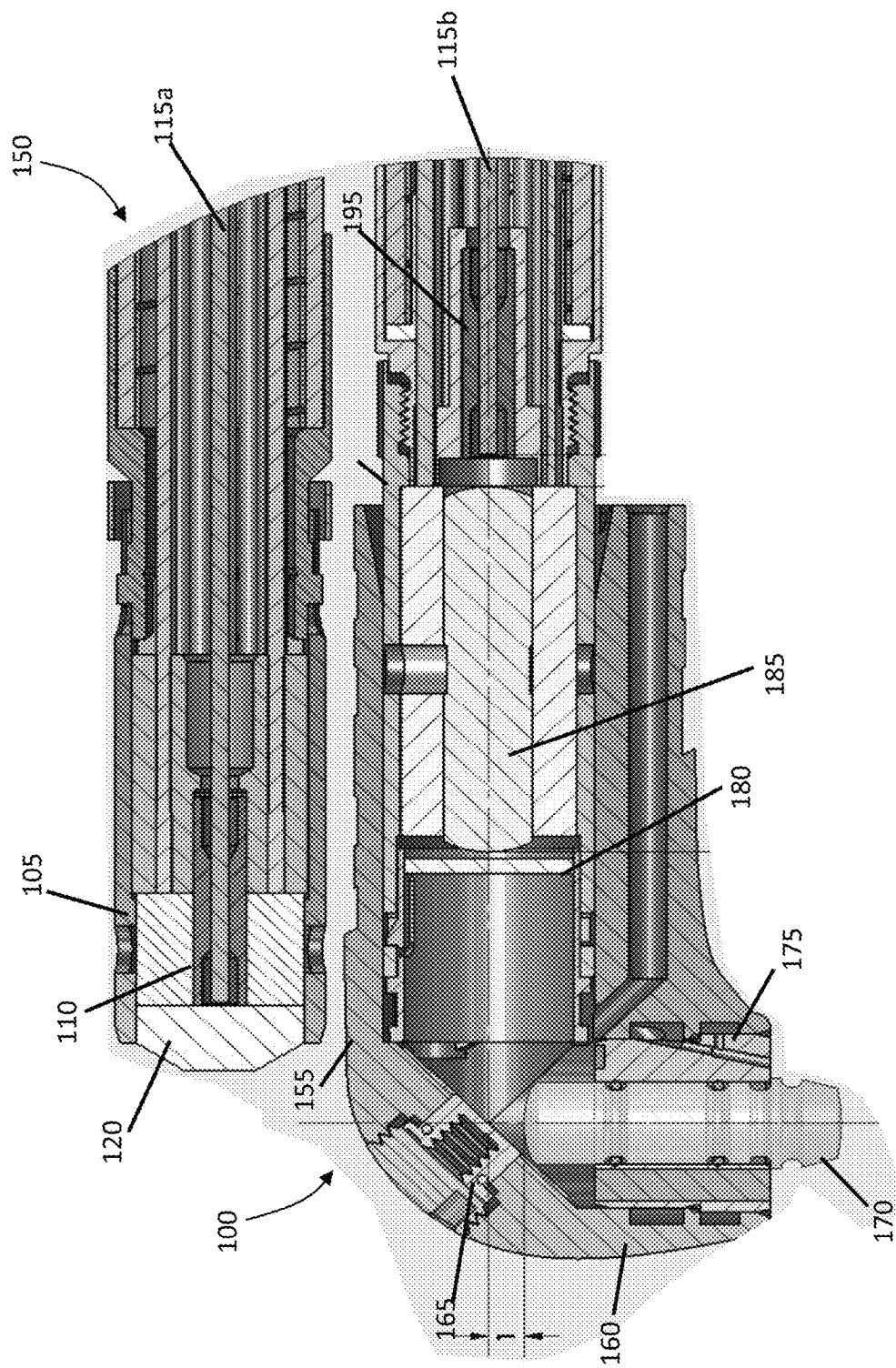
FIG. 8A illustrates a handpiece tip assembly in accordance with some embodiments of the invention.

The optical scheme as described can be integrated into a dental handpiece as shown in FIGS. 8A-8F. For example, FIG. 8A illustrates an handpiece tip assembly in accordance with some embodiments of the invention, with proximal end of handpiece tip assembly 100 and distal end of handpiece tip assembly 150 shown. In some embodiments, the handpiece tip assembly 100 and distal end of handpiece tip assembly 150 shown can form part of the dental laser station 15 (e.g., such as in at least part of the handpiece assembly 200 shown in FIG. 8B). In some embodiments, the handpiece tip assembly 100 can comprise a fiber optic (distal end) 115a abutting a tapered protective window 120, with the fiber optic (distal end) 115a encased in a fiber ferrule 110, and outer fiber bearing 105. Some embodiments include the distal end of handpiece tip assembly 150 as shown with a fiber optic (proximal end) 115b including fiber ferrule 195 enclosing the fiber optic 115b. In some embodiments, a protective window 180 can be positioned adjacent the fiber lens 185 at the proximal end of the handpiece tip assembly 150. Further, in some embodiments, the handpiece tip assembly 150 can comprise a housing 155 including handpiece head 160. In some embodiments, the mirror 165 (that can be equivalent to mirror 62 in some embodiments) is shown positioned in the head 160, and can turn an incident laser beam by about 90 degrees. Some embodiments include a tip 170 that is shown extending from adjacent the mirror 165 to outside of the head 160 in the non-limiting embodiment. Some embodiments include a tip holder/spray mixer/illumination 175 that is shown adjacent the tip 170.

Figure 8B:
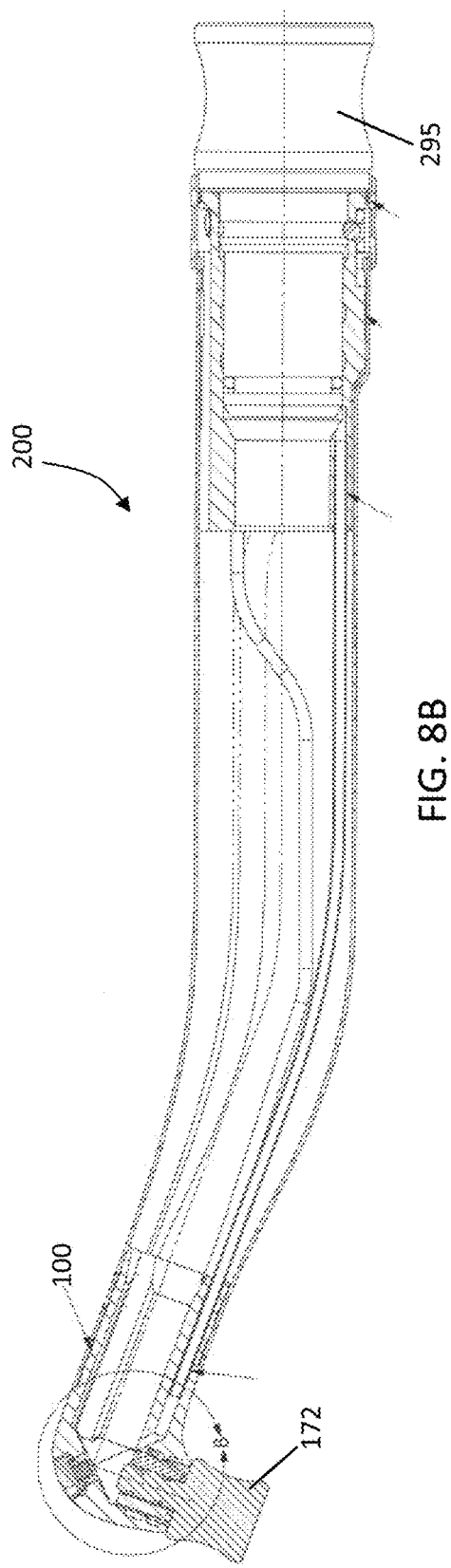
FIG. 8B illustrates a front sectional view of the handpiece assembly in accordance with some embodiments of the invention.
Figure 8C:
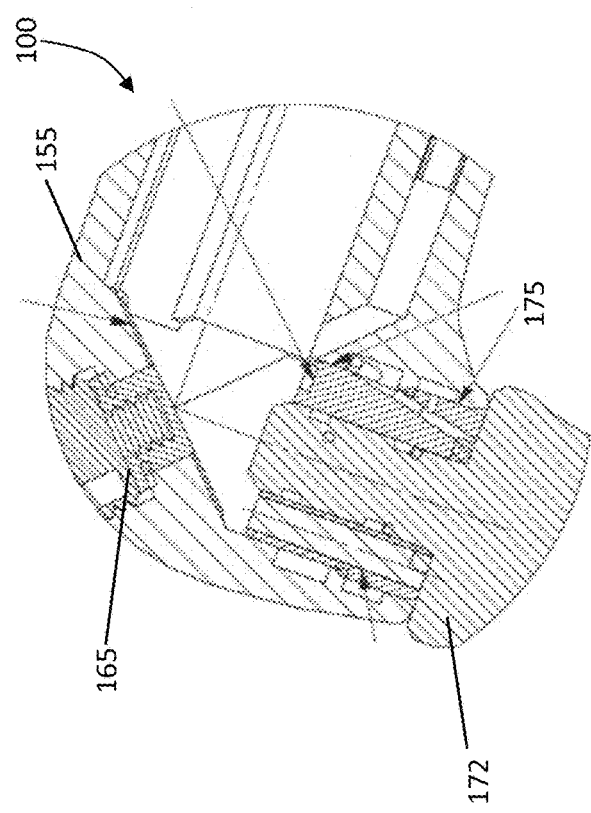
FIG. 8C illustrates an enlarged cross-sectional view of area B of FIG. 8B in accordance with some embodiments of the invention.

FIG. 8B illustrates a front sectional view of the handpiece assembly 200 in accordance with some embodiments of the invention, and FIG. 8C illustrates an enlarged cross-sectional view of area B of FIG. 8B in accordance with some embodiments of the invention. Further, FIG. 8D illustrates a top view of the handpiece assembly 200 in accordance with some embodiments of the invention, and FIG. 8E illustrates a side view of the handpiece assembly 200 in accordance with some embodiments of the invention. In some embodiments, the handpiece 200 can include a coupled handpiece tip assembly 100. In some embodiments, handpiece 200 can include handpiece shell 250 coupled to the head 160. In some embodiments, a plug 172 can be positioned as shown and can be removably inserted and removed when inserting a tip (e.g., such as tip 170).

Figure 8F:
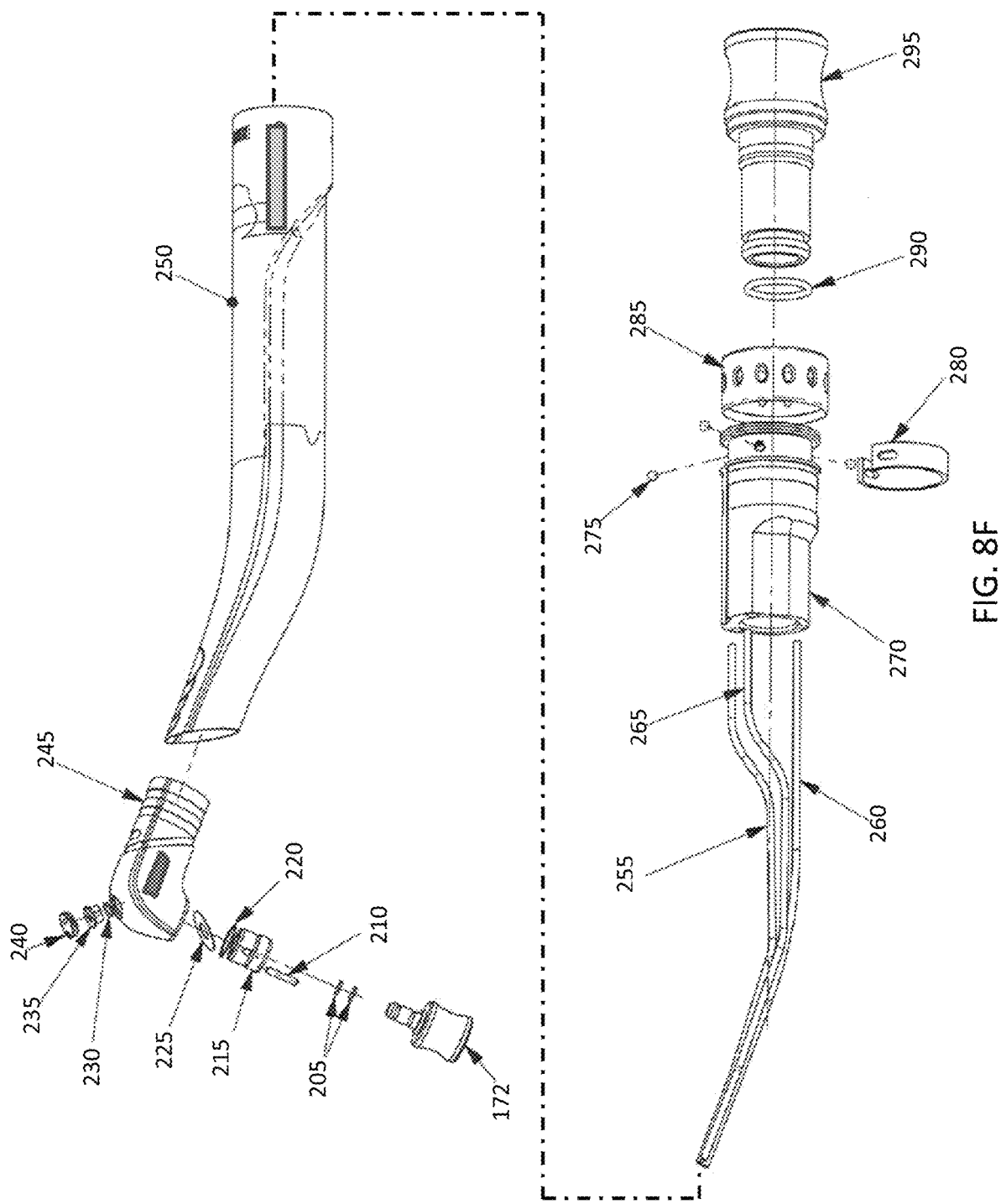
FIG. 8F illustrates an exploded assembly view of the handpiece assembly in accordance with some embodiments of the invention.

FIG. 8F illustrates an exploded assembly view of the handpiece assembly 200 in accordance with some embodiments of the invention. Some embodiments include a head 160 with one or more assembled O-ring 205, a light guide 210, a spray mixer 215, and O-ring 220, illumination mirror 225, O-ring 230, mirror 235 (e.g., mirror 165 to outside of the head 160 as shown in FIG. 8A), a coupling nut 240, and head housing 245. In some embodiments, the head 160 can be coupled to the handpiece shell 250 as shown. Some components that are positioned inside the shell 250 and/or that extend from the distal end of the handpiece assembly 200 can include water tubing 255 for delivery of fluid, cooling air tubing 260 for delivery of air or other gas, and patient air tubing 265. In some embodiments, some supporting structure at the distal end of the handpiece shell 250 can include cylinder 270. In some embodiments, a distal end assembly can comprise ball bearings 275, spring 280 and coupled exhaust 285, and plug 295 coupled with O-ring 290. One of ordinary skill in the art that the exploded assembly view of the handpiece assembly 200 is non-limiting in scope and other embodiments can include more or less components that are included to ensure adequate assembly, but may not be required, or may be alternatively positioned. For example, some embodiments can include more or fewer O-rings and/or more or less coupling components such as nuts, screws, washers, and the like, and would be considered as not changing or altering the optical functionality of the assembly 200.

Figure 9:
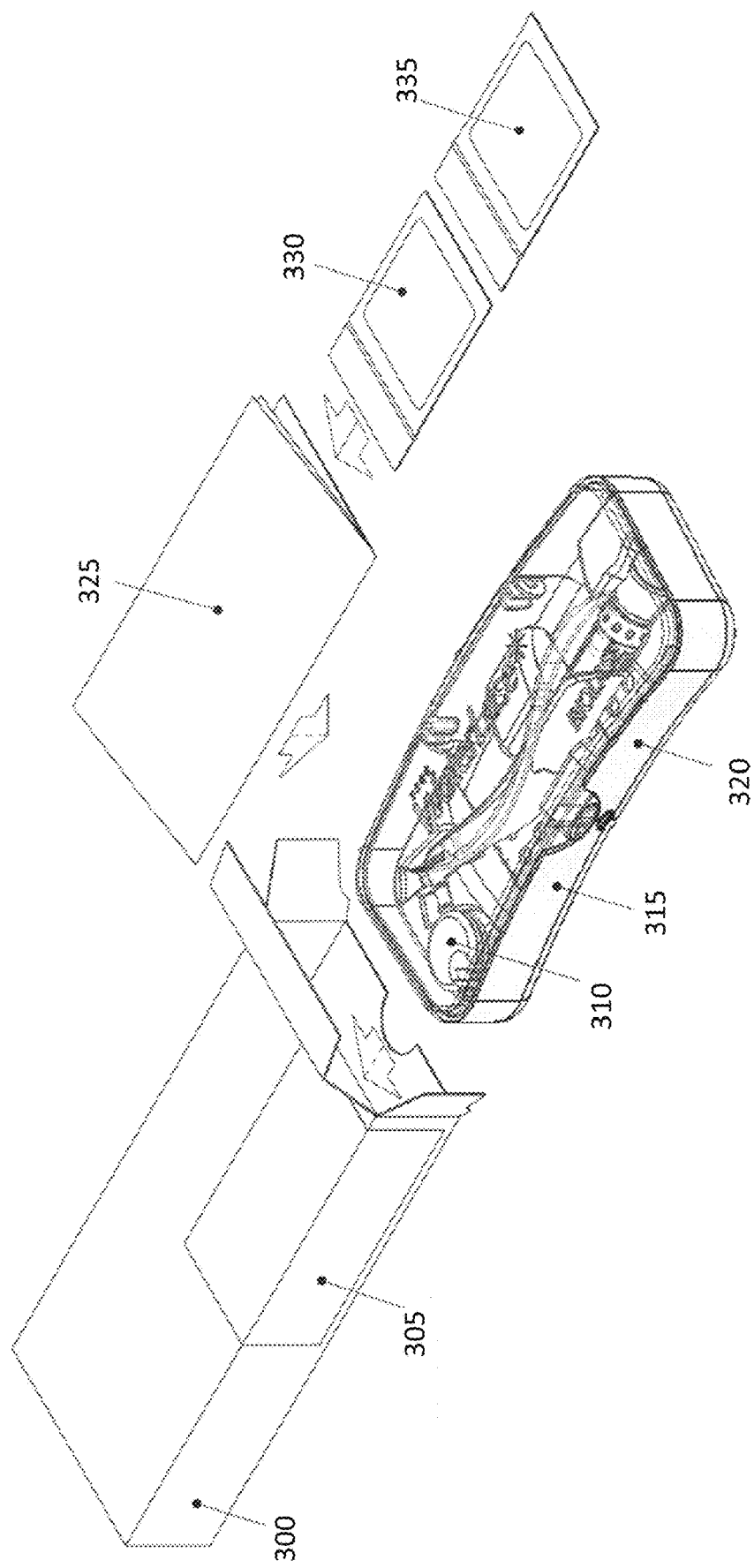
FIG. 9 illustrates an assembly view of a handpiece assembly kit in accordance with some embodiments of the invention.

In some embodiments, the handpiece assembly 200 can be provided as a kit for assembly. For example, FIG. 9 illustrates an assembly view of a handpiece assembly kit in accordance with some embodiments of the invention. In some embodiments, the handpiece assembly kit can include a box carton 300 into which fully or partially disassembled components of the handpiece assembly 200 can be delivered to one or more users 11 and/or stored and/or transported by the users 11. In some embodiments, the box carton 300 can include a label 305. In some embodiments, the carton 300 can contain handpiece assembly 310 where at least a portion of which can comprise the handpiece assembly 200. The handpiece assembly 310 can be positioned in box 315 with folding edge 320. In some embodiments, the box carton 300 can contain user instructions 325, and/or spare O-rings 330, and/or spare O-rings 335. One of ordinary skill in the art that the exploded assembly view of the handpiece assembly kit is non-limiting in scope and other embodiments can include more or less components that are included to ensure adequate assembly, but may not be required, or may be alternatively positioned. For example, some embodiments can include more or fewer O-rings and/or more or less coupling components such as nuts, screws, washers, and the like, and would be considered as not changing or altering the optical functionality of the assembly 310.

Figure 10:
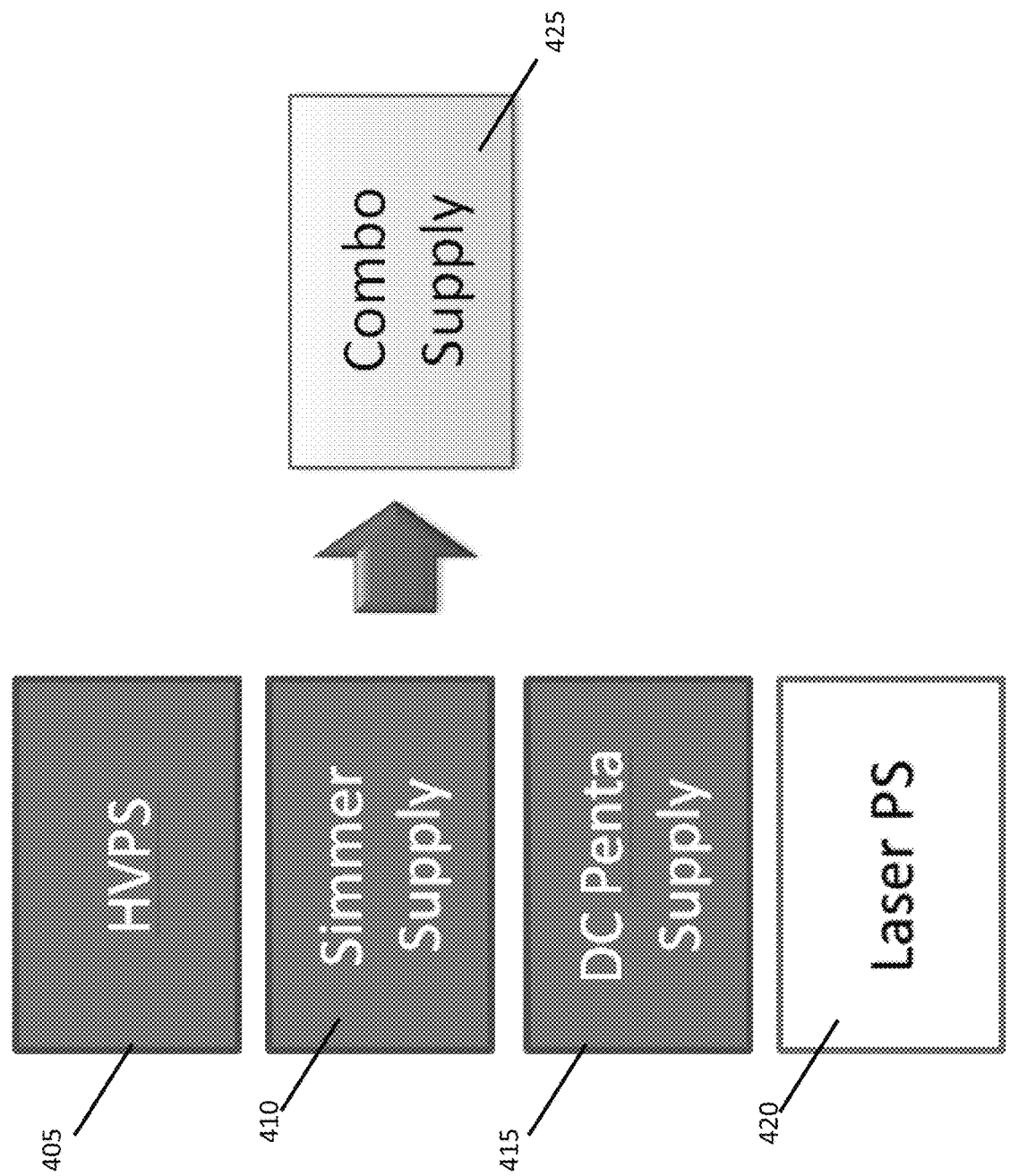
FIG. 10 illustrates a schematic of a combination power supply in accordance with some embodiments of the invention.

FIG. 10 illustrates a schematic of a combination ("combo") power supply 425 in accordance with some embodiments of the invention. In some embodiments, the dental laser station 15 can include the combination power supply 425. Some embodiments include a power supply that is a synergetic combination of multiple otherwise separate modules, performing following functions in the laser system providing energy to run the first laser system. In some embodiments, the combination can be a HV power supply HVPS 405, simmer supply 410, DC ("penta") supply 415, and laser power supply (PS) 420. In some embodiments, the laser with power supply 425 can be a flash lamp pumped laser system providing energy to trigger and maintain a plasma discharge in the flash lamp, and optionally providing energy to run a second laser system, which is not a flash lamp pumped laser system. The power supply 425 can also provide energy to support all auxiliary functions of the laser system. In some embodiments, the supply 425 can be applicable to any new or old existing laser products (e.g., with replacement of the power supplies).

With the above embodiments in mind, it should be understood that the invention can employ various computer-implemented operations involving dentistry control data stored in computer systems. Moreover, the above-described databases and models throughout the dentistry control can store analytical models and other data on computer-readable storage media within the system 30 and on computer-readable storage media coupled to the system 30. In addition, the above-described applications of the dentistry control system can be stored on computer-readable storage media within the system 30 and on computer-readable storage media coupled to the system 30. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A dental system comprising:
a processor; and
a non-transitory computer-readable storage medium in data communication with the processor, the non-transitory computer-readable storage medium comprising a dental laser management process comprising computer-executable instructions executable by a portable dental laser station, a remote access system and a graphical user interface (GUI);
the portable dental laser station configured to be controllable by the remote access system, the dental laser station comprising a dental handpiece assembly that comprises at least one dental laser to be applied to a target surface;
the remote access system, via the dental laser station, configured to control an output of a beam of the at least one dental laser via the dental handpiece assembly, the output comprising a beam size that is larger at the target surface than a beam size at a proximal end of the dental handpiece assembly; and
the GUI configured to monitor the output of the beam of the at least one laser and display parameters associated with the output of the beam, the GUI comprising functionality for enabling modification of characteristics of the beam.

2. The dental system of claim 1, further comprising:
the remote access system further configured with an optical scheme that optimizes a laser power distribution of the beam of the at least one laser to account for curvatures of the target surface.

3. The dental system of claim 2, wherein the optical scheme comprises adjusting wavelengths of the at least one laser.

4. The dental system of claim 1, further comprising:
the remote access system further configured with an optical scheme that maintains a uniform laser power distribution of the beam of the at least one laser to ensure uniform material removal from the target surface.

5. The dental system of claim 1, further comprising:
a lens coupled to the distal end of the dental handpiece assembly, the lens comprising two radii of input and output surfaces, wherein the input and output surfaces cause the beam size adjustment on the target surface.

6. The dental system of claim 5, further comprising:
a protective flat window coupled to the lens in association with the output surface.

7. The dental system of claim 6, wherein the protective flat window is replaceable.

8. The dental system of claim 1, further comprising:
a mirror coupled to the dental handpiece assembly, the mirror configured to turn a direction of the beam of the at least one dental laser.

9. The dental system of claim 8, wherein the directional turn is 90 degrees.

10. The dental system of claim 1, further comprising:
a touch screen configured to display the GUI.

11. The dental system of claim 1, further comprising:
a portable device configured to display the GUI on an associated display.

12. The dental system of claim 11, wherein the portable device is at least one of a tablet or smartphone.

13. The dental system of claim 11, wherein the remote access system is further configured to receive session and log data from any wired or wireless coupled system at a specific time or time interval.

14. The dental system of claim 13, wherein the session data includes information comprising at least one of information related to one or more procedures, settings information, errors, and time spent firing the laser.

15. The dental system of claim 13, wherein the log data comprises information related to events including screen presses in addition to raw communication data between the portable dental laser station and the remote access system.

16. The dental system of claim 1, wherein the remote access system is a device coupled to the portable dental laser station.

17. The dental system of claim 1, wherein the device of the remote access system is remotely located to the portable dental laser station, wherein communication with the portable dental laser station occurs via an electronic network.

18. The dental system of claim 1, wherein the remote access system is a set of computer-readable code tangibly stored and operational from the non-transitory computer-readable storage medium.

19. The dental system of claim 1, wherein the remote access system is further configured to provide functionality for web-enabled laser systems.

20. The dental system of claim 1, wherein the parameters of the beam comprise attributes selected from a group consisting of: laser power, pulse frequency, laser energy, air delivery options and levels and water delivery options and levels.

* * * * *